(12) United States Patent
Walker et al.

(10) Patent No.: US 10,981,728 B2
(45) Date of Patent: Apr. 20, 2021

(54) CHAIN CONVEYOR

(71) Applicant: Joy Global Underground Mining LLC, Warrendale, PA (US)

(72) Inventors: Aaron Philip Walker, Evans City, PA (US); Christopher George Stewart, Oil City, PA (US)

(73) Assignee: JOY GLOBAL UNDERGROUND MINING LLC, Warrendale, PA (US)

( * ) Notice: Subject to any disclaimer, the term of this patent is extended or adjusted under 35 U.S.C. 154(b) by 0 days.

(21) Appl. No.: 16/572,133

(22) Filed: Sep. 16, 2019

(65) Prior Publication Data
US 2020/0010277 A1    Jan. 9, 2020

Related U.S. Application Data

(63) Continuation of application No. 15/913,821, filed on Mar. 6, 2018, now Pat. No. 10,414,594.
(Continued)

(51) Int. Cl.
*B65G 19/20* (2006.01)
*B65G 17/40* (2006.01)
(Continued)

(52) U.S. Cl.
CPC ............ *B65G 19/20* (2013.01); *B65G 17/06* (2013.01); *B65G 17/26* (2013.01); *B65G 17/40* (2013.01);
(Continued)

(58) Field of Classification Search
None
See application file for complete search history.

(56) References Cited

U.S. PATENT DOCUMENTS

| 231,186 A | 8/1880 | Neacy |
| 572,991 A | 12/1896 | Howard |

(Continued)

FOREIGN PATENT DOCUMENTS

| CN | 1044627 | 8/1990 |
| CN | 2211981 | 11/1995 |

(Continued)

OTHER PUBLICATIONS

Bureau of Mines United States Department of the Interior, "Noise Study of Longwall Mining Systems", Jan. 1986, Contract JO188072, Wyole Laboratories, cover page, p. 3, pp. 131-137 (9 pages).
(Continued)

*Primary Examiner* — William R Harp
(74) *Attorney, Agent, or Firm* — Michael Best & Friedrich LLP

(57) ABSTRACT

In some aspects, a conveyor chain includes a first link, a second link, and a coupler link coupled between the first link and the second link. The first link includes a first portion and a second portion, the second portion oriented parallel to and laterally spaced apart from the first portion. The first portion includes a first sprocket-engaging pin protruding laterally, and the second portion includes a second sprocket-engaging pin protruding laterally. The second link includes a first portion and a second portion. The first portion includes a first sprocket-engaging portion protruding laterally, and the second portion includes a second sprocket-engaging portion protruding laterally. A flight bar is positioned adjacent an end of the first sprocket-engaging portion of the first link.

20 Claims, 9 Drawing Sheets

Related U.S. Application Data

(60) Provisional application No. 62/467,761, filed on Mar. 6, 2017, provisional application No. 62/467,766, filed on Mar. 6, 2017, provisional application No. 62/467,767, filed on Mar. 6, 2017, provisional application No. 62/467,769, filed on Mar. 6, 2017, provisional application No. 62/467,770, filed on Mar. 6, 2017, provisional application No. 62/467,773, filed on Mar. 6, 2017.

(51) Int. Cl.

| | | |
|---|---|---|
| *E21C 35/20* | (2006.01) | |
| *B65G 21/20* | (2006.01) | |
| *B65G 17/06* | (2006.01) | |
| *B65G 19/18* | (2006.01) | |
| *B65G 19/24* | (2006.01) | |
| *E21F 13/06* | (2006.01) | |
| *B65G 17/44* | (2006.01) | |
| *B65G 19/08* | (2006.01) | |
| *B65G 23/06* | (2006.01) | |
| *B65G 17/26* | (2006.01) | |
| *B65G 21/12* | (2006.01) | |
| *E21C 25/34* | (2006.01) | |
| *E21C 31/06* | (2006.01) | |
| *B65G 23/08* | (2006.01) | |
| *B65G 23/22* | (2006.01) | |
| *B65G 17/38* | (2006.01) | |
| *B65G 19/26* | (2006.01) | |
| *B65G 19/22* | (2006.01) | |
| *E21C 31/12* | (2006.01) | |

(52) U.S. Cl.
CPC ............ *B65G 17/44* (2013.01); *B65G 19/08* (2013.01); *B65G 19/18* (2013.01); *B65G 19/205* (2013.01); *B65G 19/24* (2013.01); *B65G 21/12* (2013.01); *B65G 21/2045* (2013.01); *B65G 23/06* (2013.01); *B65G 23/08* (2013.01); *B65G 23/22* (2013.01); *E21C 25/34* (2013.01); *E21C 31/06* (2013.01); *E21C 35/20* (2013.01); *E21F 13/066* (2013.01); *B65G 17/38* (2013.01); *B65G 19/22* (2013.01); *B65G 19/26* (2013.01); *B65G 2201/045* (2013.01); *B65G 2207/48* (2013.01); *B65G 2812/0295* (2013.01); *B65G 2812/0297* (2013.01); *E21C 31/12* (2013.01)

(56) References Cited

U.S. PATENT DOCUMENTS

| | | | |
|---|---|---|---|
| 708,924 A | 9/1902 | Scott et al. | |
| 1,008,890 A | 11/1911 | Demarest | |
| 1,020,863 A | 3/1912 | Weichseldorfer | |
| 1,153,375 A | 9/1915 | Elliott | |
| 1,427,229 A | 8/1922 | Robbins et al. | |
| 1,699,334 A | 1/1929 | Petersen | |
| 1,869,050 A | 7/1932 | Coppage | |
| 2,222,025 A | 11/1940 | Fischer | |
| 2,386,619 A | 10/1945 | Long et al. | |
| 2,450,501 A | 10/1948 | Clarkson | |
| 2,674,365 A | 4/1954 | Russell | |
| 2,754,957 A | 7/1956 | Dodson | |
| 2,761,548 A | 9/1956 | Long | |
| 2,784,836 A | 3/1957 | Tourneau | |
| 3,005,358 A | 10/1961 | Musser | |
| 3,089,579 A * | 5/1963 | Beck ..................... | B65G 19/22 198/731 |
| 3,103,275 A | 9/1963 | Rollins | |
| 3,119,276 A | 1/1964 | Pearson | |
| 3,145,576 A | 8/1964 | Proctor | |
| 3,225,897 A | 12/1965 | Rollins | |
| 3,324,990 A | 6/1967 | Karlovsky, Jr. | |
| 3,452,228 A | 6/1969 | Woolley | |
| 3,540,566 A | 11/1970 | Perry et al. | |
| 3,602,364 A | 8/1971 | Maglio et al. | |
| 4,037,713 A | 7/1977 | Soliman et al. | |
| 4,175,797 A | 11/1979 | Krekeler | |
| 4,202,219 A | 5/1980 | Weis | |
| 4,218,932 A | 8/1980 | McComber | |
| 4,238,028 A | 12/1980 | Lake | |
| 4,461,372 A | 7/1984 | Bekkala et al. | |
| 4,585,117 A | 4/1986 | Hahn | |
| 4,766,995 A | 8/1988 | Sterwerf, Jr. | |
| 4,844,314 A | 4/1989 | Wilson, III | |
| 4,899,868 A | 2/1990 | Johnson | |
| 4,917,658 A | 4/1990 | Sugimoto et al. | |
| 4,964,344 A | 10/1990 | Robinson | |
| 5,000,310 A | 3/1991 | Edmondson | |
| 5,056,651 A | 10/1991 | Nagamatsu | |
| 5,088,594 A | 2/1992 | Edmondson | |
| 5,096,048 A | 3/1992 | Lachner et al. | |
| 5,156,256 A | 10/1992 | David | |
| 5,165,766 A | 11/1992 | Thomas | |
| 5,177,949 A | 1/1993 | Stadele et al. | |
| 5,186,526 A | 2/1993 | Pennington | |
| 5,213,199 A | 5/1993 | Braun et al. | |
| 5,226,526 A | 7/1993 | O'Brien | |
| 5,249,664 A | 10/1993 | Steinkuhl | |
| 5,305,872 A | 4/1994 | Hutton | |
| 5,628,393 A | 5/1997 | Steeber | |
| 5,669,680 A | 9/1997 | Bertoni | |
| 5,762,424 A | 6/1998 | Harris et al. | |
| 6,640,534 B1 | 11/2003 | Harnaes et al. | |
| 6,662,932 B1 | 12/2003 | O'Neill | |
| 7,036,657 B1 | 5/2006 | Robinson | |
| 7,118,648 B2 | 10/2006 | Dever et al. | |
| 7,422,256 B2 | 9/2008 | Mueller | |
| 7,438,180 B1 | 10/2008 | Taylor et al. | |
| 7,442,139 B2 | 10/2008 | Kubo et al. | |
| 7,540,374 B2 | 6/2009 | Rathbun et al. | |
| 7,997,402 B2 | 8/2011 | Merten et al. | |
| 8,016,102 B2 | 9/2011 | Morris | |
| 8,038,558 B2 | 10/2011 | Klabisch et al. | |
| 8,141,696 B2 | 3/2012 | O'Neill | |
| 8,177,049 B2 | 5/2012 | O'Neill | |
| 8,360,912 B2 | 1/2013 | Klabisch et al. | |
| 8,448,781 B2 | 5/2013 | Morris | |
| 8,453,826 B2 | 6/2013 | Morris | |
| 8,672,110 B2 | 3/2014 | Jaeger | |
| 8,936,146 B2 | 1/2015 | Morris | |
| 8,950,571 B2 | 2/2015 | O'Neill | |
| 8,978,877 B2 | 3/2015 | O'Neill | |
| 9,227,787 B2 | 1/2016 | Morris et al. | |
| 9,284,124 B2 | 3/2016 | Klingbeil | |
| 9,415,939 B2 | 8/2016 | Arnold et al. | |
| 9,434,428 B2 | 9/2016 | Hakes | |
| 9,487,358 B2 | 11/2016 | Morris et al. | |
| 10,106,325 B2 | 10/2018 | Walker et al. | |
| 10,150,617 B2 | 12/2018 | O'Neill | |
| 10,414,594 B2 | 9/2019 | Walker et al. | |
| 10,442,627 B2 | 10/2019 | Walker et al. | |
| 2002/0050442 A1 | 5/2002 | Malitzki | |
| 2002/0129732 A1 | 9/2002 | Marshall | |
| 2004/0140182 A1 | 7/2004 | Morris | |
| 2005/0027459 A1 | 2/2005 | Ecker et al. | |
| 2005/0176539 A1 | 8/2005 | Hirschmann | |
| 2005/0274590 A1 | 12/2005 | Kwiat | |
| 2006/0058144 A1 | 3/2006 | Lacerda | |
| 2006/0172841 A1 | 8/2006 | Nunez et al. | |
| 2007/0107412 A1 | 5/2007 | Humcke et al. | |
| 2008/0011588 A1 | 1/2008 | Frost et al. | |
| 2009/0218199 A1 | 9/2009 | Russell | |
| 2009/0250318 A1 | 10/2009 | O'Neill | |
| 2009/0277757 A1 | 11/2009 | Boudreau | |
| 2009/0318239 A1 | 12/2009 | Kampf | |
| 2010/0276254 A1 | 11/2010 | O'Neill | |
| 2011/0067793 A1 | 3/2011 | Nukushina | |
| 2011/0067980 A1 | 3/2011 | Martin | |
| 2011/0088367 A1 | 4/2011 | Powell | |

(56) References Cited

U.S. PATENT DOCUMENTS

| | | |
|---|---|---|
| 2011/0315521 A1 | 12/2011 | O'Neill |
| 2012/0048684 A1 | 3/2012 | Morris |
| 2013/0203539 A1 | 8/2013 | Kirchner et al. |
| 2013/0227833 A1 | 9/2013 | Rizzo |
| 2013/0284569 A1 | 10/2013 | Studer |
| 2013/0334015 A1 | 12/2013 | Lasecki |
| 2014/0027247 A1 | 1/2014 | Cox et al. |
| 2014/0116850 A1 | 5/2014 | Musick et al. |
| 2014/0131177 A1 | 5/2014 | Delair et al. |
| 2014/0239699 A1 | 8/2014 | O'Neill |
| 2015/0008101 A1 | 1/2015 | Miglava |
| 2015/0101912 A1 | 4/2015 | Morris et al. |
| 2015/0191313 A1 | 7/2015 | Arnold et al. |
| 2015/0266527 A1 | 9/2015 | Akinlua et al. |
| 2015/0353152 A1 | 12/2015 | Hakes |
| 2016/0159417 A1 | 6/2016 | Zimmer et al. |
| 2016/0200520 A1 | 7/2016 | Menke et al. |
| 2017/0137226 A1 | 5/2017 | Morris et al. |

FOREIGN PATENT DOCUMENTS

| | | |
|---|---|---|
| CN | 1517280 | 8/2004 |
| CN | 201087012 | 7/2008 |
| CN | 101602433 | 12/2009 |
| CN | 101875433 | 11/2010 |
| CN | 104295668 A | 1/2015 |
| CN | 105083860 A | 11/2015 |
| CN | 105221664 A | 1/2016 |
| CN | 105386759 A | 3/2016 |
| DE | 3151059 | 7/1983 |
| DE | 19633298 | 2/1998 |
| DE | 20300239 | 3/2003 |
| EP | 1197671 | 4/2002 |
| EP | 2147875 | 1/2010 |
| EP | 2221495 | 8/2010 |
| EP | 2436944 | 4/2012 |
| GB | 205440 | 10/1923 |
| GB | 658623 | 10/1951 |
| GB | 671424 | 5/1952 |
| GB | 2458768 | 10/2009 |
| JP | 05576263 | 8/2014 |
| RU | 2064393 | 7/1996 |
| SU | 963922 | 10/1982 |
| WO | 9008716 | 8/1990 |
| WO | 03013987 | 2/2003 |
| WO | 2012054775 | 4/2012 |
| WO | 2014076164 A1 | 5/2014 |

OTHER PUBLICATIONS

Leikin A. E., Rodin B.1., "Adhesive Materials", Material Sciences. M., High School, 1971, p. 405, http://www.nglib.ru/book_view.jsp?idn=0164 70&page=405&format=free.

International Search Report with Written Opinion for Application No. PCT/US18/21228 dated May 24, 2018 (15 pages).

Search Report issued by the Polish Patent Office for Application No. 432211 dated Jun. 30, 2020 (10 pages including English Summary).

* cited by examiner

CHAIN CONVEYOR

CROSS-REFERENCE TO RELATED APPLICATIONS

This application is a continuation of prior-filed, co-pending U.S. patent application Ser. No. 15/913,821, filed Mar. 6, 2018, which claims the benefit of U.S. Provisional Patent Application No. 62/467,761, filed Mar. 6, 2017; U.S. Provisional Patent Application No. 62/467,766, filed Mar. 6, 2017; U.S. Provisional Patent Application No. 62/467,767, filed Mar. 6, 2017; U.S. Provisional Patent Application No. 62/467,769, filed Mar. 6, 2017; U.S. Provisional Patent Application No. 62/467,770, filed Mar. 6, 2017; and U.S. Provisional Patent Application No. 62/467,773, filed Mar. 6, 2017. The entire contents of each of these documents are incorporated by reference herein.

BACKGROUND

The present disclosure relates to material conveyors, and particularly to chain and flight conveyors.

SUMMARY

Mining machines such as continuous miners and chain haulage units may include chain conveyors that are capable of deflecting laterally in order to travel through lateral turns. The chain conveyors may include flight members for pushing or urging material along a pan. The chain may be driven by one or more sprockets.

In one independent aspect, a conveyor chain includes a first link, a second link, a coupler link, a first connecting pin, and a second connecting pin. The first link including a first portion and a second portion, the second portion oriented parallel to and spaced apart from the first portion. The first portion includes a first sprocket-engaging portion protruding laterally away from the second portion. The second portion includes a second sprocket-engaging portion protruding laterally away from the first portion. The second link includes a first portion and a second portion. The first portion includes a first sprocket-engaging portion protruding laterally away from the second portion of the second link. The second portion includes a second sprocket-engaging portion protruding laterally away from the first portion of the second link. The coupler link includes a first end and a second end. The first connecting pin extends through the first end of the coupler link and extends between the first portion of the first link and the second portion of the first link to removably couple the first end to the first link. The first connecting pin is oriented parallel to and offset from the first sprocket-engaging portion and the second sprocket engaging portion of the first link. The second connecting pin extends through the second end of the coupler link and extends between the first portion of the second link and the second portion of the second link to removably couple the second end to the second link. The second connecting pin is oriented parallel to and offset from the first sprocket-engaging portion and the second sprocket engaging portion of the second link.

In another independent aspect, a link assembly for a conveyor chain includes a first link and a flight. The link includes a first portion and a second portion, the second portion oriented parallel to and spaced apart from the first portion. The first portion includes a first outer surface facing away from the second portion and a first sprocket-engaging pin protruding from the first outer surface. The second portion includes a second outer surface facing away from the first portion and a second sprocket-engaging pin protruding from the second outer surface. The flight is positioned adjacent an end of the first sprocket-engaging pin and spaced apart from the first outer surface. The flight is removably coupled to the first sprocket-engaging pin.

In yet another independent aspect, a conveyor chain includes a first link, a second link, and a coupler link. The first link includes a first portion and a second portion, the second portion oriented parallel to and laterally spaced apart from the first portion. The first portion includes a first sprocket-engaging pin protruding laterally in a direction away from the second portion, and the second portion includes a second sprocket-engaging pin protruding laterally in a direction away from the first portion. The first link defines a lateral plane extending laterally between the first sprocket-engaging pin and the second sprocket-engaging pin. The lateral plane is oriented parallel to a direction of travel of the first link. The first link is symmetric about the lateral plane. The second link includes a first portion and a second portion, the second portion oriented parallel to and laterally spaced apart from the first portion. The first portion of the first link includes a first sprocket-engaging portion protruding laterally in a direction away from the second portion of the second link. The second portion of the second link includes a second sprocket-engaging portion protruding laterally in a direction away from the first portion of the second link. The second link is symmetric about the lateral plane. The coupler link includes a first end and a second end. The first end is coupled to the first link and positioned between the first portion of the first link and the second portion of the first link. The second end is coupled to the second link and positioned between the first portion of the second link and the second portion of the second link. The coupler link is symmetric about the lateral plane.

In still another independent aspect, a link assembly for a conveyor chain includes a link having a first portion and a second portion, the second portion oriented parallel to and laterally spaced apart from the first portion. The first portion includes a first outer surface facing away from the second portion and a first sprocket-engaging pin protruding from the first outer surface. The second portion includes a second outer surface facing away from the first portion and a second sprocket-engaging pin protruding from the second outer surface. The link defines a lateral plane extending laterally between the first sprocket-engaging pin and the second sprocket-engaging pin. The lateral plane is oriented parallel to a direction of travel of the link. The link is symmetric about the lateral plane.

In yet another independent aspect, a link assembly for a conveyor chain includes a first link and a flight. The first link includes a first portion and a second portion, the second portion oriented parallel to and spaced apart from the first portion. The first portion includes a first outer surface facing away from the second portion and a first sprocket-engaging pin protruding from the first outer surface. The second portion includes a second outer surface facing away from the first portion and a second sprocket-engaging pin protruding from the second outer surface. The flight is positioned adjacent an end of the first sprocket-engaging pin and spaced apart from the first outer surface. The flight includes a scraper portion configured to engage a conveyor deck as the flight moves in a direction of travel. The scraper portion includes at least one base surface and a plurality of hardened portions, the hardened portions having a hardness that is greater than a hardness of the base surface.

Other aspects will become apparent by consideration of the detailed description and accompanying drawings.

Figure 1:
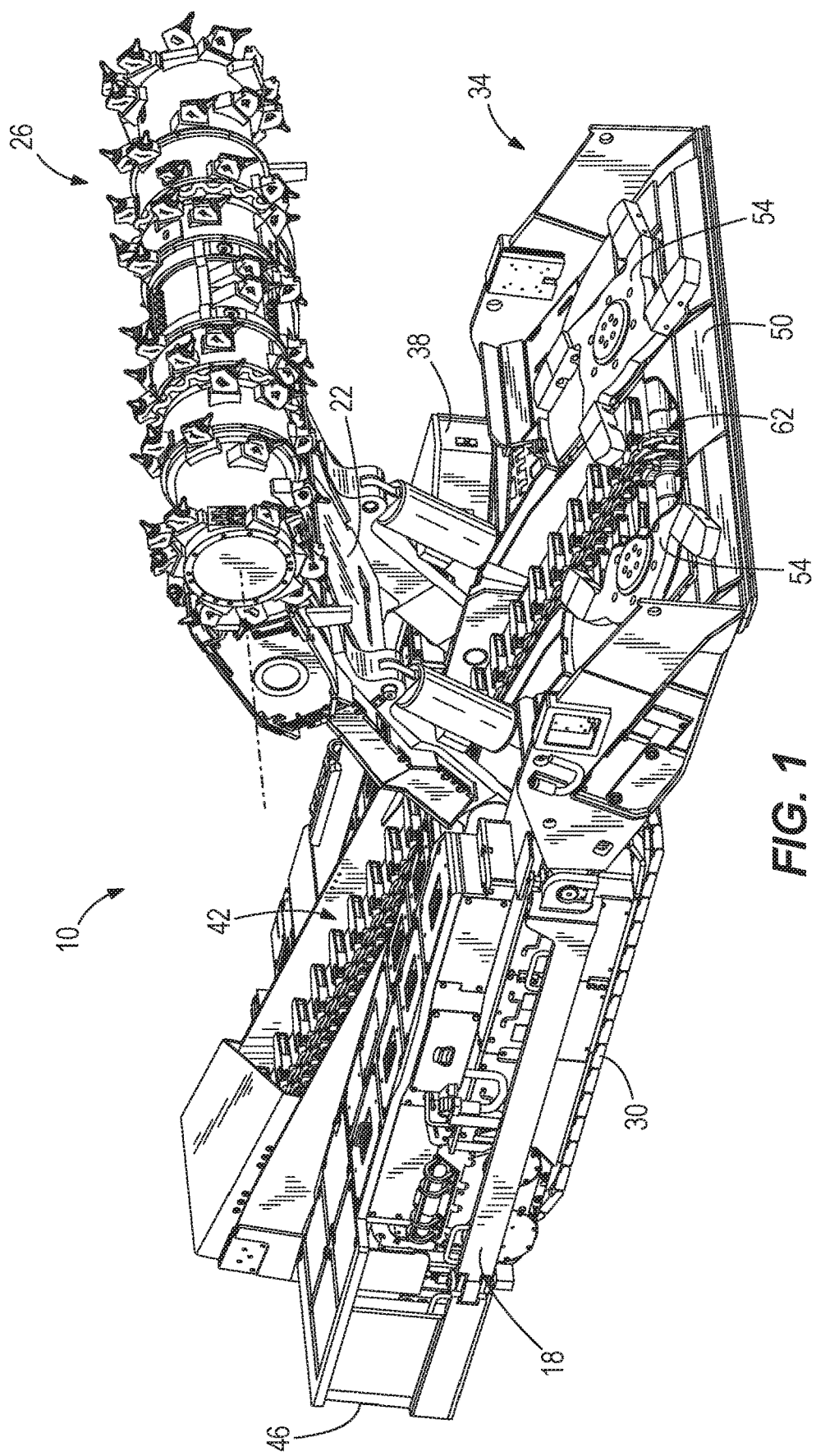
FIG. 1 is a perspective view of a mining machine with a portion of a gathering head cutaway.

Before any independent embodiments of the disclosure is explained in detail, it is to be understood that the disclosure is not limited in its application to the details of the construction and the arrangements of components set forth in the following description or illustrated in the drawings. The disclosure is capable of other independent embodiments and of being practiced or being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or fluid connections or couplings, whether direct or indirect. Also, electronic communications and notifications may be performed using any known means including direct connections, wireless connections, etc.

DETAILED DESCRIPTION

FIG. 1 illustrates a mining machine 10, such as a continuous mining machine. In the illustrated embodiment, the mining machine 10 includes a frame or chassis 18, a boom 22 pivotably coupled to the chassis 18, and a cutter head 26 supported on the boom 22. The chassis 18 may be supported for movement relative to a support surface (not shown) by a traction mechanism (e.g., crawlers 30).

Figure 2:
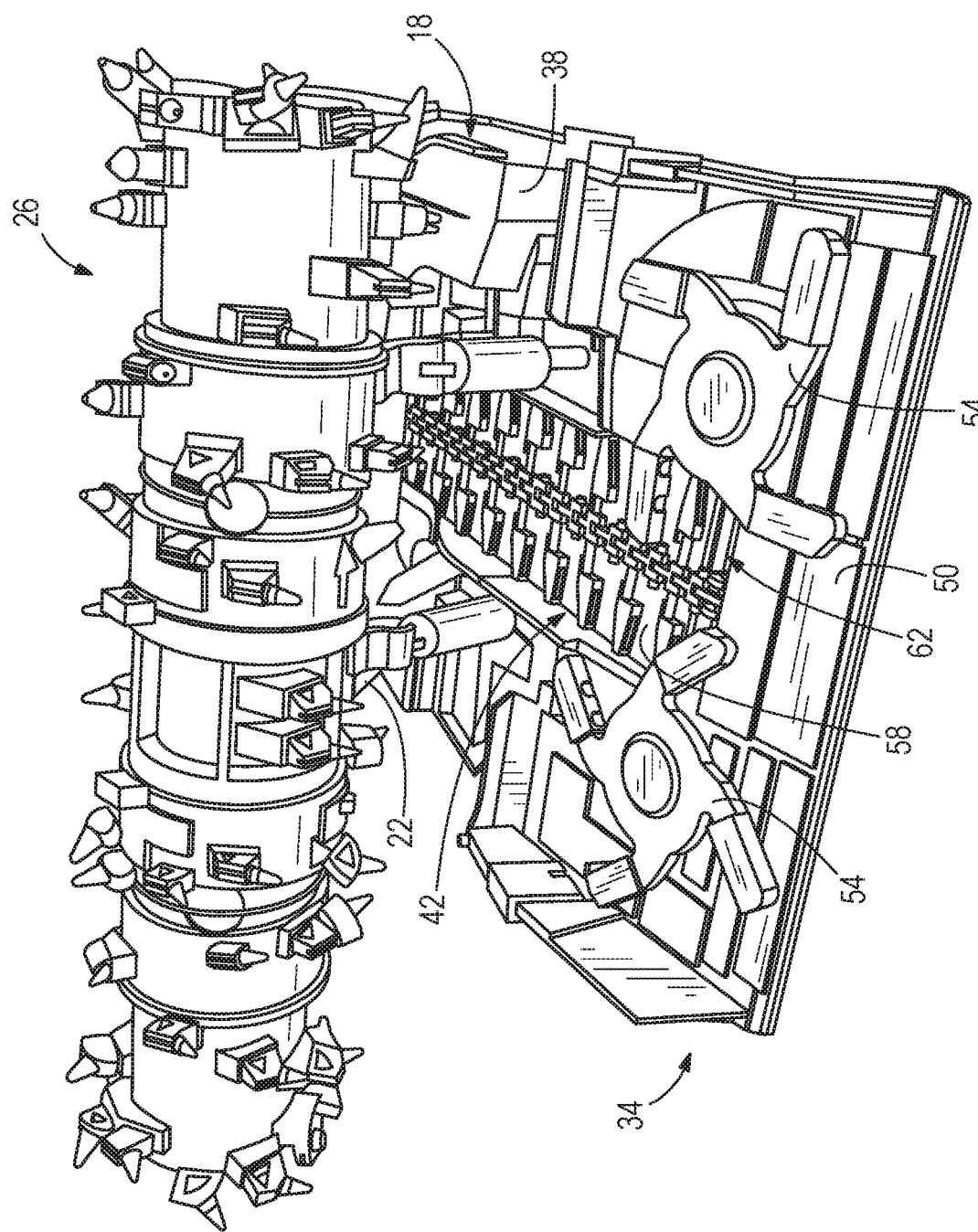
FIG. 2 is a perspective view of a forward end of the mining machine of FIG. 1.

As shown in FIGS. 1 and 2, a collecting mechanism or gathering head 34 is positioned adjacent a first end or forward end 38 of the chassis 18, and a conveyor 42 extends in a continuous loop from the forward end 38 of the chassis 18 toward a second or rear end 46 of the chassis 18. The gathering head 34 is positioned below the cutter head 26 and includes a deck 50 and a pair of rotating arms 54 that engage and direct dislodged material onto the conveyor 42. The conveyor 42 transports the cut material from the forward end 38 toward the rear end 46 (FIG. 1) of the chassis 18, from the area below the cutter head 26 to another conveyor or a haulage machine (not shown) positioned proximate the rear end 46 of the chassis 18.

Figure 3:
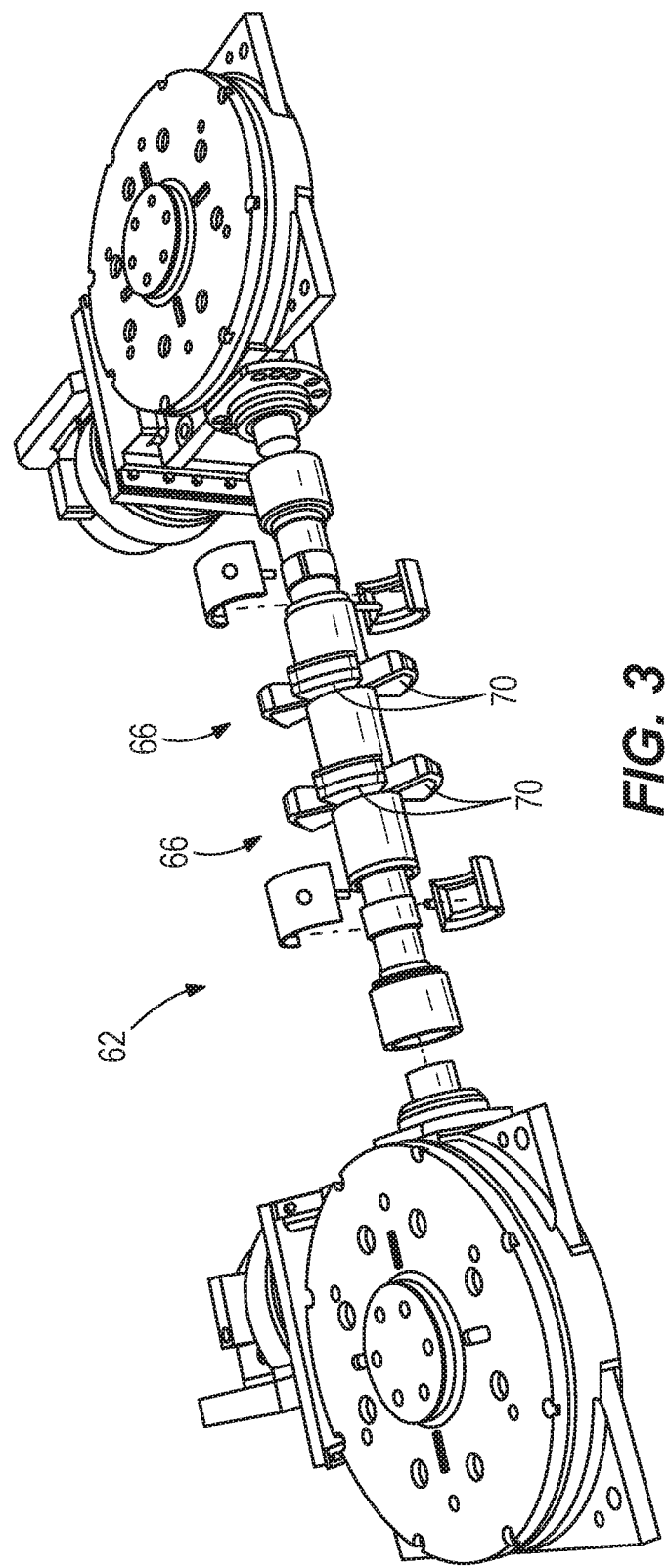
FIG. 3 is an exploded view of a conveyor drive assembly.

As shown in FIG. 2, the conveyor 42 is a chain conveyor formed by chain link connected sequentially in a continuous loop. The conveyor 42 drives cut material along a chain pan or deck 58. The conveyor 42 is driven by a drive assembly including a shaft 62 positioned adjacent the gathering head 34 of the chassis 18. As shown in FIG. 3, the shaft 62 is oriented laterally relative to the chassis 18 (FIG. 2) and is driven (e.g., by one or more motors) to rotate relative to the chassis 18. A pair of sprockets 66 engage and move the conveyor 42. In the illustrated embodiment, each sprocket 66 includes four teeth or lobes 70 spaced apart about the shaft 62, and recesses between the lobes 70 receive and drive the conveyor 42.

Figure 4:
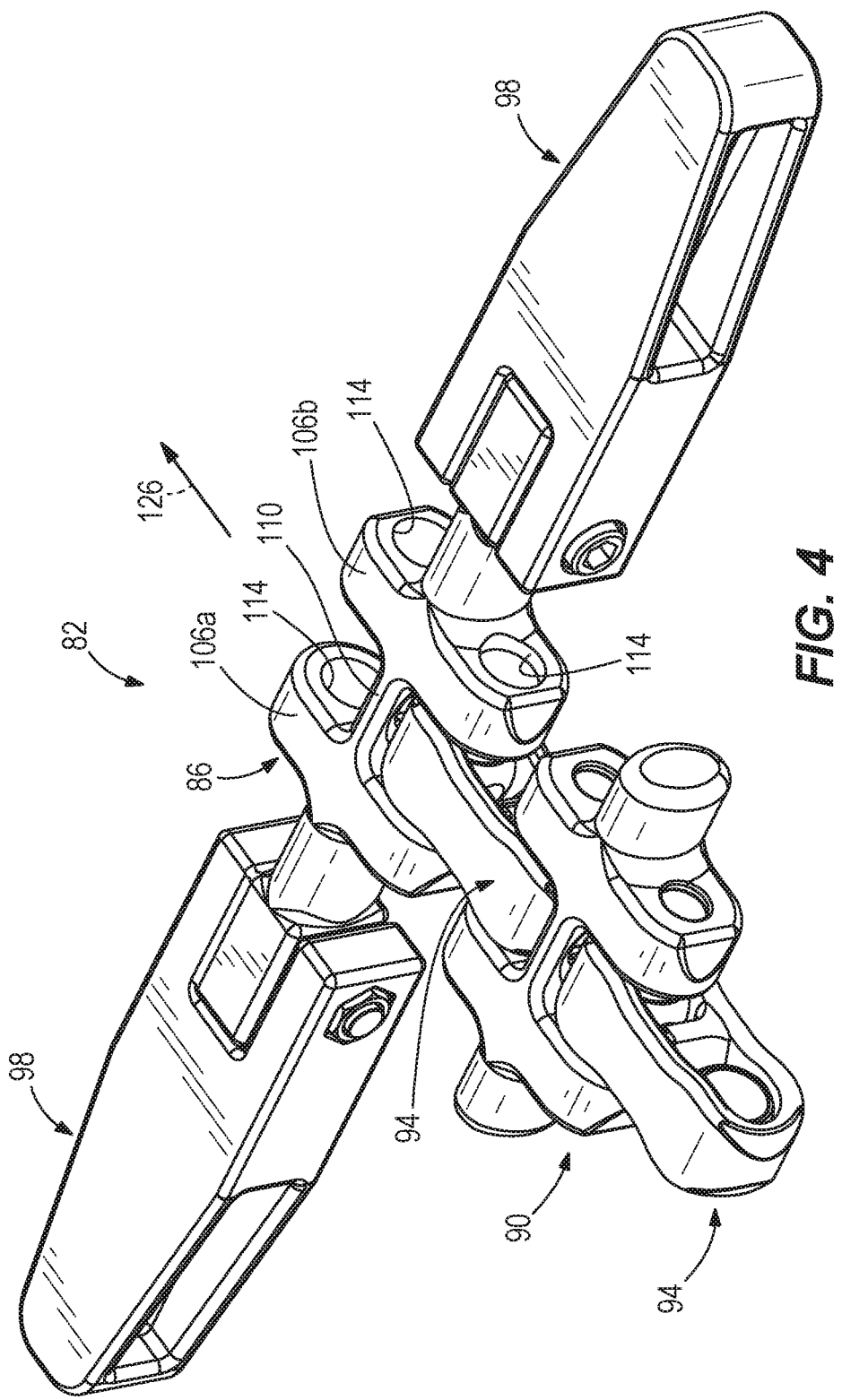
FIG. 4 is a perspective view of a chain conveyor unit.
Figure 5:
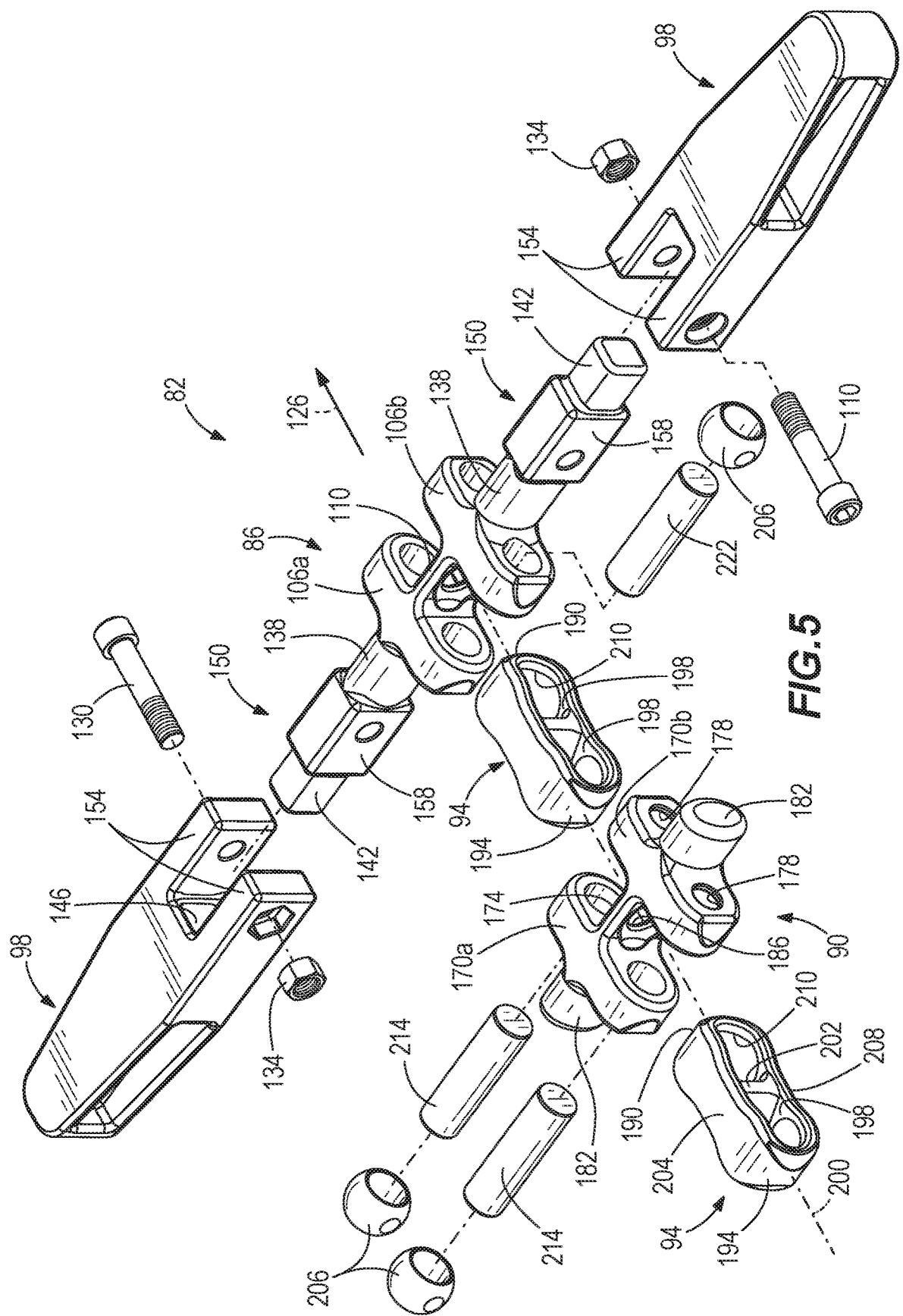
FIG. 5 is an exploded view of the chain conveyor unit of FIG. 4.

FIGS. 4 and 5 show a unit of the chain 82 that forms the conveyor 42. In the illustrated embodiment, the chain 82 includes a first link or flight link 86, a second link or connecting link 90, a coupler link or swivel link 94 coupling the flight link 86 to the connecting link 90, and flights or flight bars 98 positioned laterally outward from the flight link 86. Another swivel link 94 may couple the connecting link 90 to another flight link (not shown), and the conveyor chain 82 may therefore include a sequence of alternating flight links and connecting links, each joined to one another by swivel links. In other embodiments, the chain 82 may include a different sequence of links—for example, multiple connecting links may be positioned between one flight link and the subsequent flight link. Various permutations of the link sequence are possible.

In the illustrated embodiment, the flight link 86 includes a pair of lugs or side portions 106 (a first side portion 106a and a second side portion 106b) and a bridge 110 extending between inner surfaces of the side portions 106. Each side portion 106 includes a pair of apertures 114 extending through the inner surface and an outer surface of each side portion 106.

As best shown in FIG. 5, the flight link 86 further includes a pair of flight pins 122, and each flight pin 122 extends outwardly from the outer surface of one of the side portions 106. In the illustrated embodiment, the flight pins 122 are aligned with one another (i.e., along a common axis), and each of the flight pins 122 is positioned between chain pins 222 (described in further detail below). Stated another way, the flight pins 122 extend laterally or transversely relative to a direction of travel 126 of the conveyor 42. Each of the flight pins 122 is positioned between the apertures 114 of the associated side portion 106. In the illustrated embodiment, each flight bar 98 is removably coupled to one of the flight pins 122 (e.g., by a threaded bolt 130 and nut 134). A sprocket-engaging portion or drive portion 138 of each flight pin 122 is positioned between the side portion 106 and the associated flight bar 98. In the illustrated embodiment, an end portion 142 of each flight pin 122 is positioned within an opening 146 of one of the flight bars 98.

Figure 6:
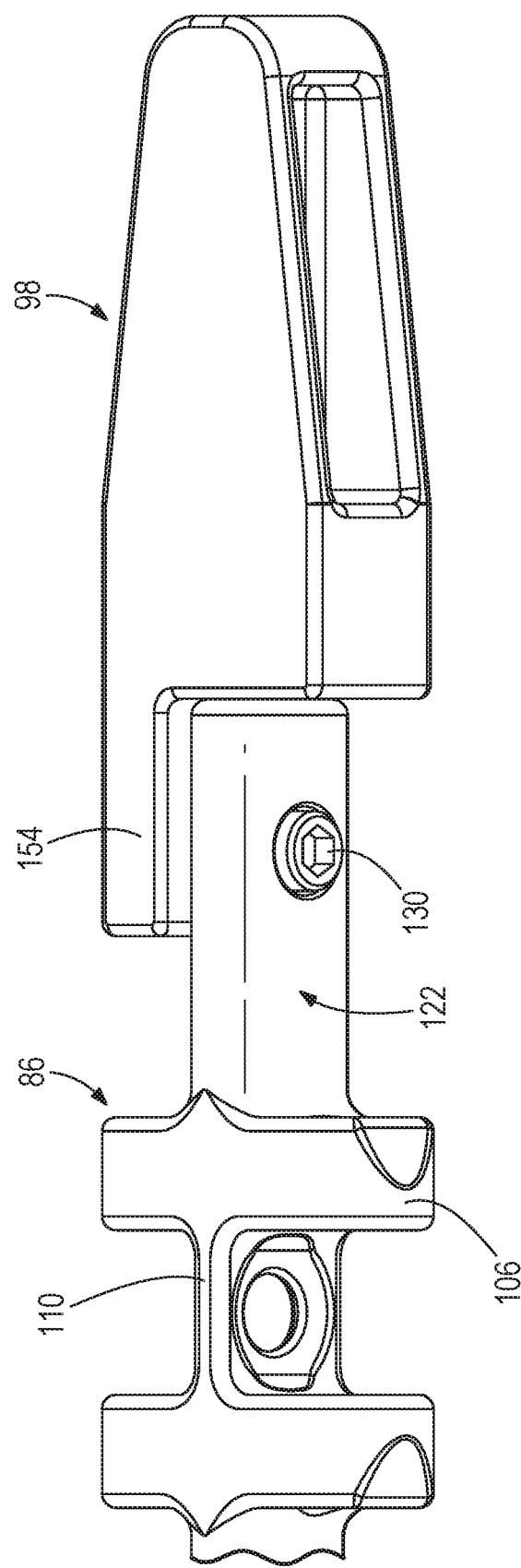
FIG. 6 is a perspective view of a flight link and a flight bar according to another embodiment.

In addition, the flight pin 122 includes a pilot portion 150 positioned between the end portion 142 and the drive portion 138. The pilot portion 150 is positioned between two lugs 154 of the flight bar 98. Side surfaces 158 of the pilot portion 150 contact and engage side surfaces of the flight bar lugs 154. The contact between the pilot portion 150 and lugs 154 prevents rotation of the flight bar 98 about the flight pin 122 and provides a reaction surface to reduce shear stress on the bolt 130. In the illustrated embodiment, the pilot portion 150 has a rectangular cross-section and the bolt 130 extends through the pilot portion; in other embodiments, the pilot portion may have a different cross-section shape and/or the bolt 130 may extend through a different portion of the flight pin 122. Also, in other embodiments (FIG. 6), the flight bar 98 may include only one lug 154.

As shown in FIG. 5, each connecting link 90 includes a pair of lugs or side portions 170 (a first side portion 170a and a second side portion 170b) and a bridge 174 extending between inner surfaces of the side portions 170. Each side portion 170 includes a pair of apertures 178 extending through the inner surface and an outer surface of each side portion 170. In addition, a drive pin 182 extends outwardly from an outer surface of each side portion 170. Stated another way, each drive pin 182 extends laterally or transversely relative to the direction of travel 126 of the chain 82. Each drive pin 182 is positioned between the apertures 178 of the associated side portion 170. The sprockets 66 (FIG. 3) engage the drive pins 182 and the drive portions 138 of the flight pins 122 to drive the chain 82. In the illustrated embodiment, the bridge 174 of the connecting link 90 includes an opening 186.

Referring now to FIG. 5, the swivel link 94 includes a first end 190, a second end 194, and a pair of openings 198 extending laterally from one side of the swivel link 94 to another, opposite side of the swivel link 94. A swivel link longitudinal axis 200 extends between the first end 190 and the second end 194. Under nominal operating conditions, the swivel link longitudinal axis 200 is aligned with the direction of travel 126 of the chain 82. In the illustrated embodiment, the swivel link 94 is formed as a vertical open chain link in which the openings 198 are separated by a gusset or reinforcement member 202. The reinforcement member 202 extends between a first or upper wall 204 and a second or lower wall 208 of the swivel link 94. Each swivel link 94 further includes a pair of support members or bearings, such as spherical bearings 206. Each bearing 206 is positioned in a pocket 210 (FIG. 5) formed in an associated one of the openings 198 of the swivel link 94.

One of the openings 198 is aligned with parallel apertures 178 in the side portions 170 of the connecting link 90, while the other opening 198 is aligned with parallel apertures 114 in the side portions 106 of the flight link 86. A first connecting pin or first chain pin 214 is inserted through the apertures 178 of the connecting link side portions 170 and through one opening 198 of the swivel link 94, thereby coupling the swivel link 94 to the connecting link 90. Similarly, a second connecting pin or second chain pin 222 is inserted through the apertures 114 of the flight link side portions 106 and through the other opening 198 of the swivel link 94, thereby coupling the swivel link 94 to the flight link 86. Each of the chain pins 214, 222 is supported for pivoting movement relative to the swivel link 94 by one of the bearings 206 positioned in the connected swivel link 94.

In addition, in the illustrated embodiment, the first chain pin 214 is inserted through the connecting link side portions 170 in a first lateral direction, while the second chain pin 222 is inserted through the flight link side portions 106 in a second lateral direction opposite the first lateral direction. The chain pins 214, 222 are secured against movement relative to the connecting link 90 and the flight link 86 by retainers (e.g., self-locking retaining rings—not shown). Also, in some embodiments, an outer side of one of the side portions 170 may include an aperture having a reduced diameter such that each pin 214 can only be inserted from one side of the connecting link to the other. The apertures of the flight link may be structured in a similar manner.

The chain pins 214, 222 can be removed from the associated links with hand tools, at least partially because of the sliding fit connections between the pins 214, 222 and the links 86, 90, 94. As a result, individual components of the chain 82 may be easily disassembled, replaced, and reassembled on-site, without requiring hot work (e.g., cutting torches, welding tools, etc.). The chain 82 can be fully rebuilt. Portions of the chain 82 may also be removed without requiring additional parts (e.g., to re-connect the chain ends).

Similarly, the flight bars 98 are removably coupled to the flight pins 122 rather than attached by welding. Unlike conventional conveyors, worn or damaged flight bars 98 can be easily replaced individually rather than replacing the entire flight section, thereby lowering maintenance cost of the chain 82.

The chain 82 is symmetric across a horizontal plane bisecting the chain 82 into an upper portion and a lower portion. Stated another way, the chain 82 is symmetric from top to bottom. Unlike conventional chains, the chain 82 may be installed with either the upper or lower surface engaging the conveyor deck 58. In addition, after a period of use, the chain 82 may be inverted such that the upper portion of the chain 82 is positioned adjacent the deck 58 and the chain 82 may be operated. The inversion of the chain 82 may provide additional working life for the chain and reduce the frequency of replacement for chain components. In addition, the symmetric chain 82 avoids the need for dedicated scraper flights for return deck cleaning.

Figure 7:
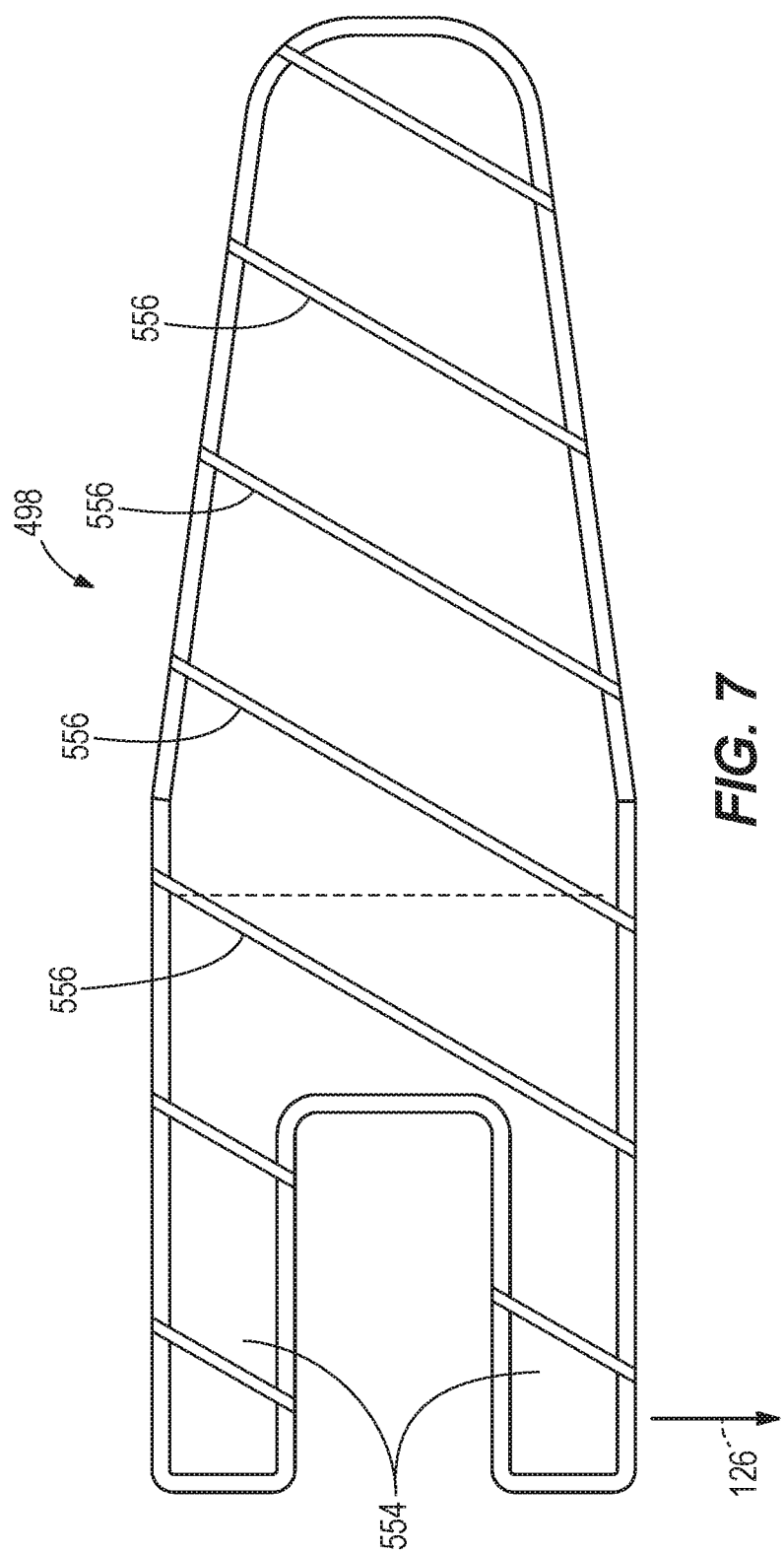
FIG. 7 is a plan view of a surface of a flight bar according to another embodiment.

FIG. 7 illustrates another embodiment of the flight bar 498 including lines or sections 556 of high hardness, low wear material positioned on a surface of the flight bar 498. In the illustrated embodiment, the sections are formed in lines extending at an angle relative to a direction of travel 126 of the flight bar 498 such that adjacent sections overlap one another relative to the direction of travel 126 (as illustrated by the dashed line between sections 556 in FIG. 7). The localized hardening of portions of the flight bar 98 provides areas or regions having a lower wear rate than the base material of the flight bar 98. As the base material of the flight bar 98 wears, the hardened areas remain and stand away from the base part creating a scraping edge for removing material from the chain deck 58. The hardened sections 556 may be positioned on both major surfaces of the flight bar 498.

Figure 8:
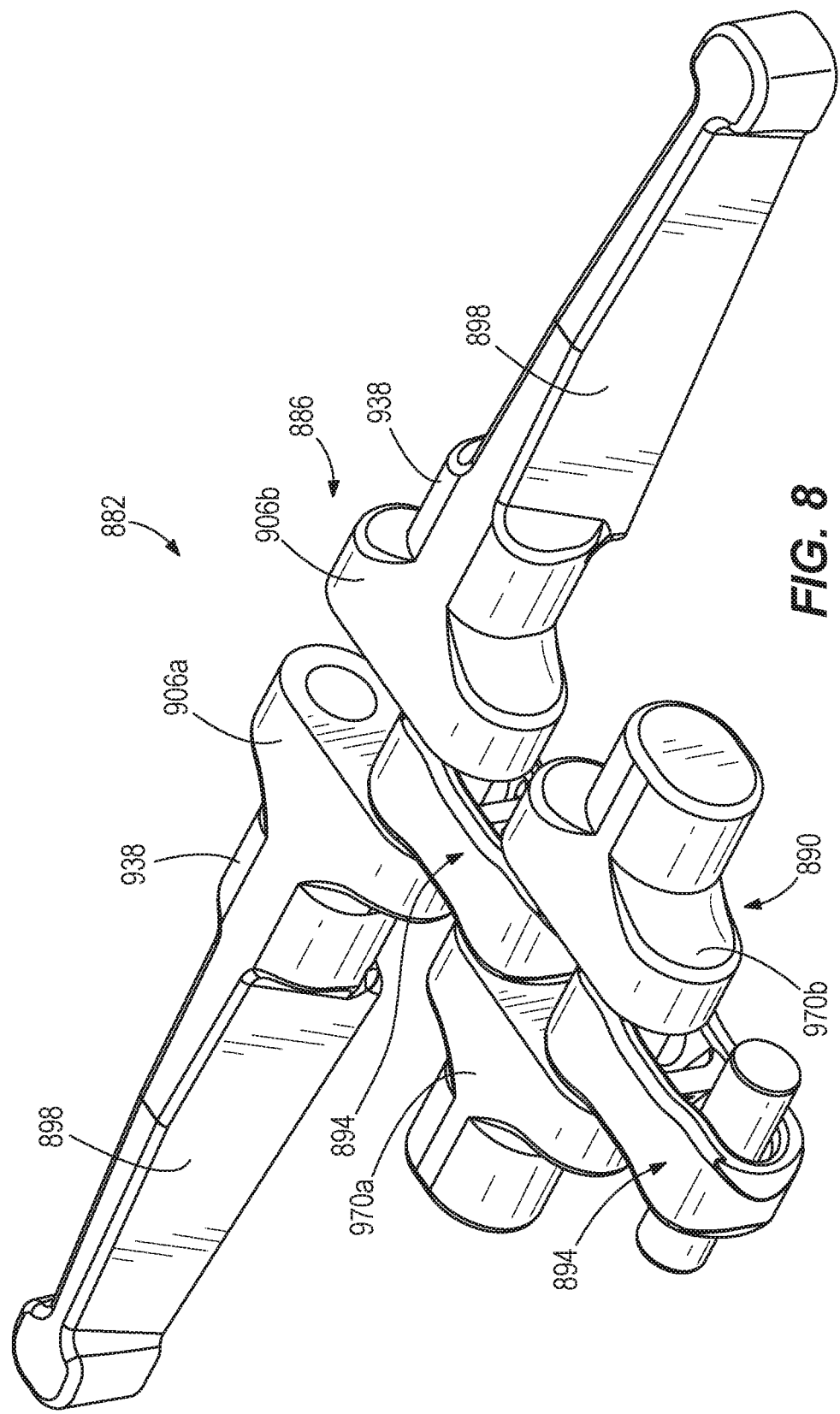
FIG. 8 is a perspective view of a chain conveyor unit according to another embodiment.
Figure 9:
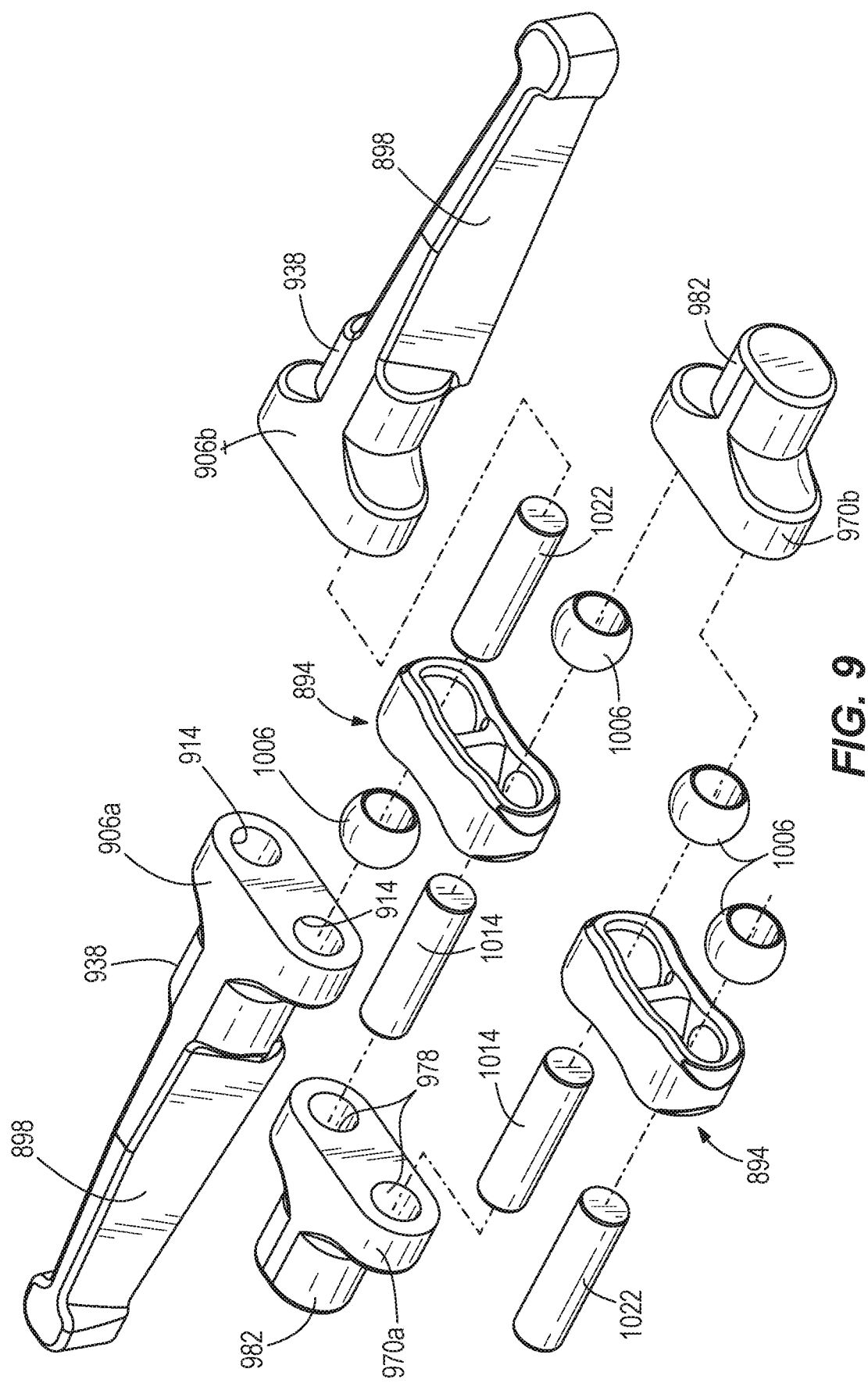
FIG. 9 is an exploded view of the chain conveyor unit of FIG. 8.

FIGS. 8 and 9 illustrate a chain 882 according to another embodiment. Features of the chain 882 are similar to features of the chain 82 and are identified with similar reference numbers, plus 800. At least some differences and/or at least some similarities between the chain 82 and 882 are described below. In addition, components or features described with respect to only one or some of the embodiments described herein are equally applicable to any other embodiments described herein.

The chain 882 includes a flight link 886 including a pair of side portions 906 that are separate from one another and not directly connected. Stated another way, the flight link 886 does not include a bridge between the side portions 906. Rather, the side portions 906 are coupled to one another by the connecting pins 1022 (FIG. 9) extending between the side portion 906 and through a swivel link 894. Similarly, a connecting link 890 includes a pair of side portions 970 that are separate from one another and not directly connected. Stated another way, the connecting link 886 does not include a bridge between the side portions 970, which are formed as separate components 970a, 970b. Rather, the side portions 970 are coupled to one another by the connecting pins 1014 (FIG. 9) extending between the side portion 970 and through the swivel link 894.

In addition, a flight 898 is formed integrally with each side portion 906 of the flight link 886. In the illustrated embodiment, a drive portion 938 protrudes from each side portion 906, and the flight 898 extends laterally outwardly from an end of the drive portion 938. The drive portion 938 is positioned between the side portion 906 and the flight 898. It is understood that aspects of the chain 882 may be incorporated into other disclosed embodiments. For example, an integral flight may be incorporated into the flight link 86 described above with respect to FIGS. 4 and 5.

Although the conveyor is described above with respect to a continuous mining machine, it is understood that the conveyor may be incorporated into other types of machines including but not limited to roadheaders and entry drivers, as well as loading and hauling machines including but not limited to shuttle cars, battery haulers, or other types.

Although aspects have been described in detail with reference to certain preferred embodiments, variations and modifications exist within the scope and spirit of one or more independent aspects as described.

What is claimed is:

1. A link assembly for a conveyor chain, the link assembly comprising:
   a link including a first portion and a second portion, the second portion oriented parallel to and spaced apart from the first portion, the first portion including a first outer surface facing away from the second portion and a pin protruding from the first outer surface; and
   a flight including a body and a single lug extending from the body, the lug positioned adjacent one side of the pin, the body extending in a direction away from an end of the pin, the lug coupled to the pin to removably couple the flight to the pin.

2. The link assembly of claim 1, wherein a fastener extends between the pin and the lug to couple the lug to the pin.

3. The link assembly of claim 2, wherein the fastener includes a bolt having a head engaging one of an outer surface of the lug and an outer surface of the pin, further including a nut threadably engaging the bolt and engaging the other of the outer surface of the lug and the outer surface of the pin.

4. The link assembly of claim 1, wherein the flight is a first flight, and wherein the second portion includes a second outer surface facing away from the first portion and a second pin protruding from the second outer surface, the link assembly further comprising,
   a second flight including a body and a single lug extending from the body of the second flight, the lug positioned adjacent one side of the second pin, the body extending in a direction away from an end of the second pin, the lug coupled to the second pin to removably couple the second flight to the second pin.

5. The link assembly of claim 1, wherein the first portion of the link and the second portion of the link are integral with one another.

6. The link assembly of claim 1, wherein the flight includes a first part made from a first material and a second part made from a second material having a higher hardness than the first material.

7. The link assembly of claim 6, wherein the second part includes an edge oriented at an oblique angle relative to the direction of travel.

8. The link assembly of claim 1, wherein the pin includes a sprocket-engaging portion, and wherein the pin and the sprocket-engaging portion are in alignment relative to the first portion of the link.

9. A link assembly for a conveyor chain, the link assembly comprising:
   a link including a first portion and a second portion, the second portion oriented parallel to and spaced apart from the first portion, the first portion including a first outer surface facing away from the second portion and a first sprocket-engaging portion protruding from the first outer surface, the second portion including a second outer surface facing away from the first portion; and
   a flight positioned adjacent an end of the first sprocket-engaging portion, the flight including a first part made from a first material and a second part made from a second material having a higher hardness than the first material;
   wherein as the first part wears during normal use, the second part protrudes beyond a surface of the first part and provides a scraping edge.

10. The link assembly of claim 9, wherein the second part includes an edge oriented at an oblique angle relative to a direction of travel of the flight.

11. The link assembly of claim 9, wherein the second part is one of a plurality of second parts, and wherein the plurality of second parts are spaced apart from one another along a length of the flight.

12. The link assembly of claim 11, wherein the each of the plurality of second parts are oriented at oblique angle relative to a direction of travel of the flight, each of the second parts overlapping with an adjacent one of the second parts relative to the direction of travel of the flight.

13. The link assembly of claim 9, wherein the flight is a first flight, wherein the second portion includes a second sprocket-engaging portion protruding from the second outer surface, the link assembly further comprising,
   a second flight positioned adjacent an end of the second sprocket-engaging portion, the second flight including a first part made from a first material and a second part made from a second material having a higher hardness than the first material.

14. The link assembly of claim 9, wherein the first portion of the link and the second portion of the link are integral with one another.

15. The link assembly of claim 9, wherein the flight is removably coupled adjacent the end of the first sprocket-engaging portion by a fastener.

16. A conveyor chain comprising:
   a first link including a first portion and a second portion, the second portion oriented parallel to and spaced apart from the first portion, the first portion including a first sprocket-engaging portion protruding laterally away from the second portion, the second portion including a second sprocket-engaging portion protruding laterally away from the first portion;
   a second link including a first portion and a second portion, the first portion of the second link including a first sprocket-engaging portion protruding laterally away from the second portion of the second link, the second portion of the second link including a second sprocket-engaging portion protruding laterally away from the first portion of the second link;
   a coupler link including a first end and a second end;
   a first connecting pin extending through the first end of the coupler link, the first connecting pin extending between the first portion of the first link and the second portion of the first link to removably couple the first end of the coupler link to the first link, the first connecting pin oriented parallel to and offset from the first sprocket-engaging portion and the second sprocket-engaging portion of the first link;
   a second connecting pin extending through the second end of the coupler link, the second connecting pin extending between the first portion of the second link and the second portion of the second link to removably couple the second end of the coupler link to the second link, the second connecting pin oriented parallel to and offset from the first sprocket-engaging portion and the second sprocket-engaging portion of the second link; and
- a first flight positioned adjacent an end of the first sprocket-engaging portion of the first link, the flight including a first part made from a first material and a second part made from a second material having a higher hardness than the first material.

17. The conveyor chain of claim 16, wherein the second part includes an edge oriented at an oblique angle relative to a direction of travel of the flight.

18. The conveyor chain of claim 16, wherein the second part is one of a plurality of second parts, and wherein the plurality of second parts are spaced apart from one another along a length of the flight, each of the plurality of second parts oriented at an oblique angle relative to a direction of travel of the flight, each of the second parts overlapping with an adjacent one of the second parts relative to the direction of travel of the flight.

19. The conveyor chain of claim 16, further comprising a second flight positioned adjacent an end of the second sprocket-engaging portion of the second link, the second flight including a first part made from a first material and a second part made from a second material having a higher hardness than the first material.

20. The conveyor chain of claim 19, wherein the first flight is removably coupled adjacent the end of the first sprocket-engaging portion by a first fastener, and wherein the second flight is removably coupled adjacent the end of the second sprocket-engaging portion by a second fastener.

* * * * *